(12) United States Patent
Tanaka

(10) Patent No.: US 11,992,953 B2
(45) Date of Patent: May 28, 2024

(54) ABNORMALITY DETERMINATION DEVICE AND ABNORMALITY DETERMINATION METHOD

(71) Applicant: Nissan Motor Co., Ltd., Kanagawa (JP)

(72) Inventor: Yasuhiro Tanaka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 661 days.

(21) Appl. No.: 16/972,449

(22) PCT Filed: Jun. 4, 2018

(86) PCT No.: PCT/JP2018/021338
§ 371 (c)(1),
(2) Date: Dec. 4, 2020

(87) PCT Pub. No.: WO2019/234789
PCT Pub. Date: Dec. 12, 2019

(65) Prior Publication Data
US 2021/0229282 A1 Jul. 29, 2021

(51) Int. Cl.
*B25J 9/16* (2006.01)
(52) U.S. Cl.
CPC ............. *B25J 9/1674* (2013.01); *B25J 9/163* (2013.01); *B25J 9/1653* (2013.01)
(58) Field of Classification Search
CPC ........ B25J 9/1674; B25J 9/163; B25J 9/1653; G05B 2219/37344; G05B 23/0221
See application file for complete search history.

(56) References Cited

U.S. PATENT DOCUMENTS 10,112,305 B2 10/2018 Kuno
10,466,142 B2 11/2019 Hiruta et al.
(Continued)

FOREIGN PATENT DOCUMENTS

EP 3270252 A1 8/1989
EP 3 238 887 A2 11/2017
(Continued)

OTHER PUBLICATIONS

"The shift function: a powerful tool to compare two entire distributions", basic statistics, simple steps to improve statistical analyses in neuroscience & psychology, https://protect-us.mimecast.com/s/DQevCYE0qgsLk4gGl0GhH4?domain=garstats.wordpress.com, Jul. 12, 2016 (53 pages).
S. Weglarczyk; "Kernel density estimation and its application"; ITM Web of Conferences, vol. 23, No. 37, pp. 1-8; Jan. 2018 (8 pages).

*Primary Examiner* — Jonathan L Sample
*Assistant Examiner* — Mohammed Yousef Abuelhawa
(74) *Attorney, Agent, or Firm* — Osha Bergman Watanabe & Burton LLP

(57) ABSTRACT

An abnormality determination device includes a control unit for determining an abnormality of a robot, the control unit being configured to calculate a measurement probability distribution which is a probability distribution using disturbance torque acquired during a predetermined period as a random variable. The control unit causes an average of the calculated measurement probability distribution to conform to an average of an evaluation normal model which is a predetermined probability distribution, compares the measurement probability distribution with the evaluation normal model of which the respective averages conform to each other, and determines an abnormality of the robot in accordance with a result of the comparison.

10 Claims, 9 Drawing Sheets

(56) References Cited

U.S. PATENT DOCUMENTS

| | | |
|---|---|---|
| 10,543,604 B2 | 1/2020 | Shimizu et al. |
| 2011/0227786 A1* | 9/2011 | Ono .................. G01S 19/20 |
| | | 342/357.23 |
| 2014/0046630 A1 | 2/2014 | Smith |
| 2014/0222352 A1* | 8/2014 | Sander-Tavallaey .................. |
| | | G01N 19/08 |
| | | 901/46 |
| 2016/0033955 A1* | 2/2016 | Satake ............... G05B 23/0272 |
| | | 700/174 |
| 2018/0017467 A1 | 1/2018 | Hiruta et al. |
| 2018/0133901 A1 | 5/2018 | Kuno |
| 2018/0154529 A1 | 6/2018 | Shimizu et al. |
| 2018/0181083 A1* | 6/2018 | Kosaka .................. G05B 5/01 |
| 2019/0046283 A1* | 2/2019 | Nagao ................. B25J 19/0004 |
| 2021/0278832 A1* | 9/2021 | Koumoto ........... G05B 23/0218 |

FOREIGN PATENT DOCUMENTS

| | | |
|---|---|---|
| JP | H0829538 A | 2/1996 |
| JP | H09174482 A | 7/1997 |
| JP | H1026648 A | 1/1998 |
| JP | 2014514581 A | 6/2014 |
| JP | 2016197040 A | 11/2016 |
| JP | 201810636 A | 1/2018 |
| WO | 2013050314 A1 | 4/2013 |
| WO | 2013105164 A1 | 7/2013 |
| WO | 2014/033433 A1 | 3/2014 |
| WO | 2016185593 A1 | 11/2016 |
| WO | 2016189608 A1 | 12/2016 |

* cited by examiner

ABNORMALITY DETERMINATION DEVICE AND ABNORMALITY DETERMINATION METHOD

TECHNICAL FIELD

The present invention relates to an abnormality determination device and an abnormality determination method of determining an abnormality caused in an apparatus such as a robot.

BACKGROUND ART

Abnormality determination devices for articulated robots are known, as disclosed in Patent Literature 1, The device disclosed in Patent Literature 1 detects a moving position of each joint shaft of a robot and disturbance torque applied to the joint shaft at predetermined intervals when the robot is in operation, and calculates an average of the disturbance torque detected at the respective moving positions. The device then compares the calculated average with a predetermined threshold, and determines that the robot has an abnormality when the average exceeds the threshold.

CITATION LIST

Patent Literature

Patent Document 1: Japanese Unexamined Patent Application Publication No. H09-174432

SUMMARY OF INVENTION

Technical Problem

The device may make a wrong determination that the robot operating in a normal state has an abnormality if using the constant threshold, since the value of the disturbance torque greatly varies depending on the types of causes. For example, a great variation may be caused in the disturbance torque immediately after maintenance is made such as a replacement of a speed reducer provided in the robot or immediately after teaching (a teaching change) is executed. The great variation in the disturbance torque with no abnormality caused in the robot may lead the device to make a wrong determination that the robot has an abnormality.

In view of the foregoing problem, the present invention provides an abnormality determination device and an abnormality determination method capable of executing an abnormality determination for an apparatus with a high accuracy.

Technical Solution

An aspect of the present invention is an abnormality determination device configured to calculate a measurement probability distribution which is a probability distribution using data acquired during a predetermined period as a random variable, and compare the measurement probability distribution with an evaluation normal model which is a predetermined probability distribution while causing reference points of the measurement probability distribution and the evaluation normal model to conform to each other. The device determines an abnormality of the apparatus in accordance with a result of the comparison.

Advantageous Effects

The aspect of the present invention can execute an abnormality determination of the apparatus with a high accuracy.

DESCRIPTION OF EMBODIMENTS

Embodiments of the present invention will be described below with reference to the drawings.

Explanations of First Embodiment

Figure 1:
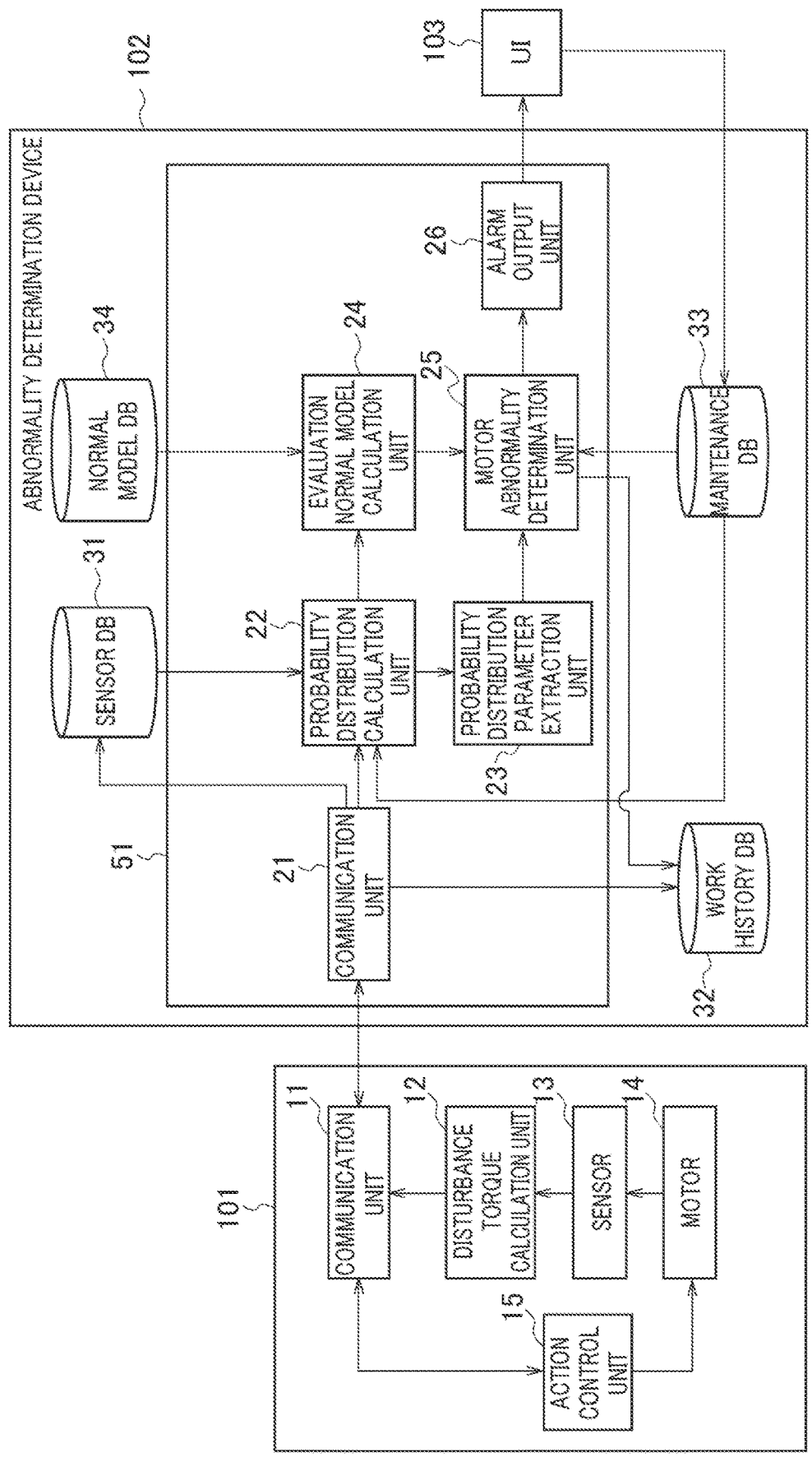
FIG. 1 is a block diagram illustrating a configuration of an abnormality determination device according to a first embodiment of the present invention, and peripheral apparatuses.

FIG. 1 is a block diagram illustrating a configuration of an abnormality determination device according to a first embodiment of the present invention, and peripheral apparatuses. As illustrated in FIG. 1, the abnormality determination device 102 according to the present embodiment is connected to a robot 101 (an apparatus) and a user interface 103 (indicated by reference sign "U1" in FIG. 1), and determines an abnormality of the robot 101. As used herein, the phrase "determining an abnormality" encompasses a concept of not only determining an abnormality, currently caused but also predicting an abnormality which can be caused in the future.

The robot 101 is a teaching-playback multi-axis robot, for example. The term "teaching-playback." is indicative of a function of actually operating a robot to make action by an operator using a teaching pendant belonging to the robot, and storing and reproducing the action so as to cause the robot to perform the action. While the present embodiment is illustrated with the teaching-playback robot, the present invention is not limited to this case.

The robot 101 includes a motor 14 (a movable part), an action control unit 15, a sensor 13, a disturbance torque calculation unit 12, and a communication unit 11. While the robot 101 includes a plurality of motors 14, FIG. 1 illustrates only one motor 14.

Each motor 14 is a servo motor provided in a speed reducer for operating each joint shaft of a robot arm, and is operated in accordance with the control by the action control unit 15. The operation of the respective motors 14 causes a welding electrode (a welding part) mounted at the tip of the robot anal, for example, to come into contact with a necessary part of a target object to be processed (for example, a metal blank material) so as to execute the welding operation. The robot 101 can further execute various kinds of operations such as pressing, coating, resin molding, and assembling of a target object, in addition to the welding operation.

The sensor 13, which is mounted in the robot 101, includes a pulse generator or an encoder, for example, and detects various kinds of physical amounts such as a position and an angle of the robot arm operated by the respective motors 14, a rotation angle, a rotation speed, power consumption, and a current of each motor 14, and a rotation angle of the speed reducer driven by each motor 14. The sensor 13 also detects a value of torque caused in each motor 14. The sensor data detected by the sensor 13 is sent to the abnormality determination device 102 through the communication unit 11.

The action control unit 15 causes the respective motors 14 to operate according to an action program set by the teaching described above, and controls the respective robot arms and the joint shafts mounted on the robot 101 to perform necessary actions. The action control unit 15 outputs work data acquired when the robot 101 is operated to the communication unit 11. The work data includes various kinds of information regarding the work of the robot 101. The specific explanations are made below.

The disturbance torque calculation unit 12 calculates disturbance torque caused in each motor 14. The term "disturbance torque" refers to a difference between a torque instruction value when controlling each motor 14 and a torque detection value detected by the sensor 13. The difference between the torque instruction value and the torque detection value is substantially constant when the motor 14 is in a normal state and operates stably, and the disturbance torque thus shows a stable numerical value. When an abnormality is caused in the motor 14, the operation of the corresponding motor 14 is not stable, and a great change occurs in the disturbance torque applied to the motor 14. The disturbance torque is an example of data regarding the states of the robot 101 (the apparatus).

The communication unit 11 sends the work data of the robot 101, the disturbance torque calculated by the disturbance torque calculation unit 12, and various kinds of sensor data detected by the sensor 13 to the abnormality determination device 102.

The respective functions that the robot 101 has can be implemented in single or plural processing circuits. The respective processing circuits include a programmed processing device, such as a processing device including an electric circuit. The processing device includes an application-specific integrated circuit (ASIC) configured to execute the functions that the robot 101 has, and conventional circuit components.

The user interface 103 includes an input unit (not illustrated) on which the operator operates various kinds of operations, and a display (not illustrated) for displaying the various kinds of information sent from the abnormality determination device 102. When the operator inputs maintenance data indicating that maintenance has been made for the robot 101 via the input unit, the user interface 103 stores the input maintenance data in a maintenance DB 33.

Next, the configuration of the abnormality determination device 102 is described below. The abnormality determination device 102 includes a control unit 51 and various kinds of databases (DBs). The control unit 51 includes a communication unit 21, a probability distribution calculation unit 22, a probability distribution parameter extraction unit 23, an evaluation normal model calculation unit 24, a motor abnormality determination unit 25, and an alarm output unit 26. The databases include a sensor DB 31, a work history DB 32, the maintenance DB 33, and a normal model DB 34.

The sensor DB 31 stores the sensor data such as the position and the angle of the respective robot arms, and the rotation angle and the rotation speed of the respective motors 14. The sensor DB 31 also stores the disturbance torque calculated by the disturbance torque calculation unit 12. The sensor DB 31 thus serves as a storage unit configured to store the disturbance torque (the data regarding the states of the apparatus).

The work history DB 32 stores the work data of the robot 101. The work data includes various kinds of data regarding the work of the robot 101, such as a work date, a work-started time, a work-stopped time, a continuous work time, and a continuous suspension dine. The work data also includes a drive mode of the speed reducer driven by each motor 14. The drive mode includes a regular drive mode, a maintenance mode, and a stop mode.

The maintenance DB 33 stores the maintenance data on maintenance made for the robot 101 acquired when an abnormality is caused or the occurrence of an abnormality is predicted in the respective motors 14. The maintenance data can be input by the operator through the user interface 103. Alternatively, the maintenance may be determined to be made when the robot 101 is operated in the maintenance mode described above, so as to automatically create and store the maintenance data. The maintenance data includes an ID number of the motor 14 or the speed reducer to be maintained, the date and time of the maintenance executed, and the contents of the maintenance (such as a replacement, a repair, and a change of grease).

The normal model DB 34 stores a normal model in which an average of disturbance torque is zero. A means of creating the normal model may be a t-distribution using a variation and an average, or a normal distribution. A histogram may also be used.

The communication unit 21 communicates with the communication unit 11 included in the robot 101. The communication unit 21 receives the work data of the robot 101 sent from the robot 101, and outputs the work data to the work history DB 32. The communication unit 21 also receives the disturbance torque and the sensor data sent from the robot 101, and outputs the received data to the sensor DB 31.

The probability distribution calculation unit 22 acquires the disturbance torque of the respective motors 14 detected in a time-series manner during a predetermined period and stored in the sensor DB 31, and calculates a probability distribution based on the acquired disturbance torque. In particular, the probability distribution calculation unit 22 sets a period of time retroactive to a predetermined time (for example, 12 hours) from the current time as a predetermined period, acquires the disturbance torque during this predetermined period, and calculates the probability distribution of the disturbance torque acquired. The calculated probability distribution is hereinafter referred to as a "measurement probability distribution". A means of calculating the measurement probability distribution may be conventional kernel density estimation, for example.

Figure 3:
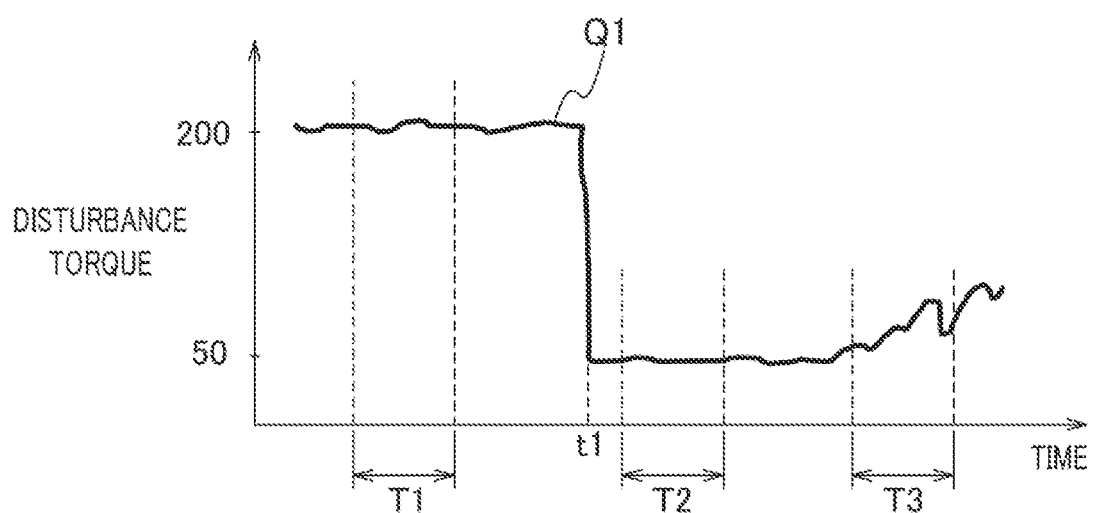
FIG. 3 is a graph showing a change in disturbance torque caused in a motor, wherein T1 and T2 each indicate a normal period of the disturbance torque, and T3 indicates an abnormal period of the disturbance torque.
Figure 4:
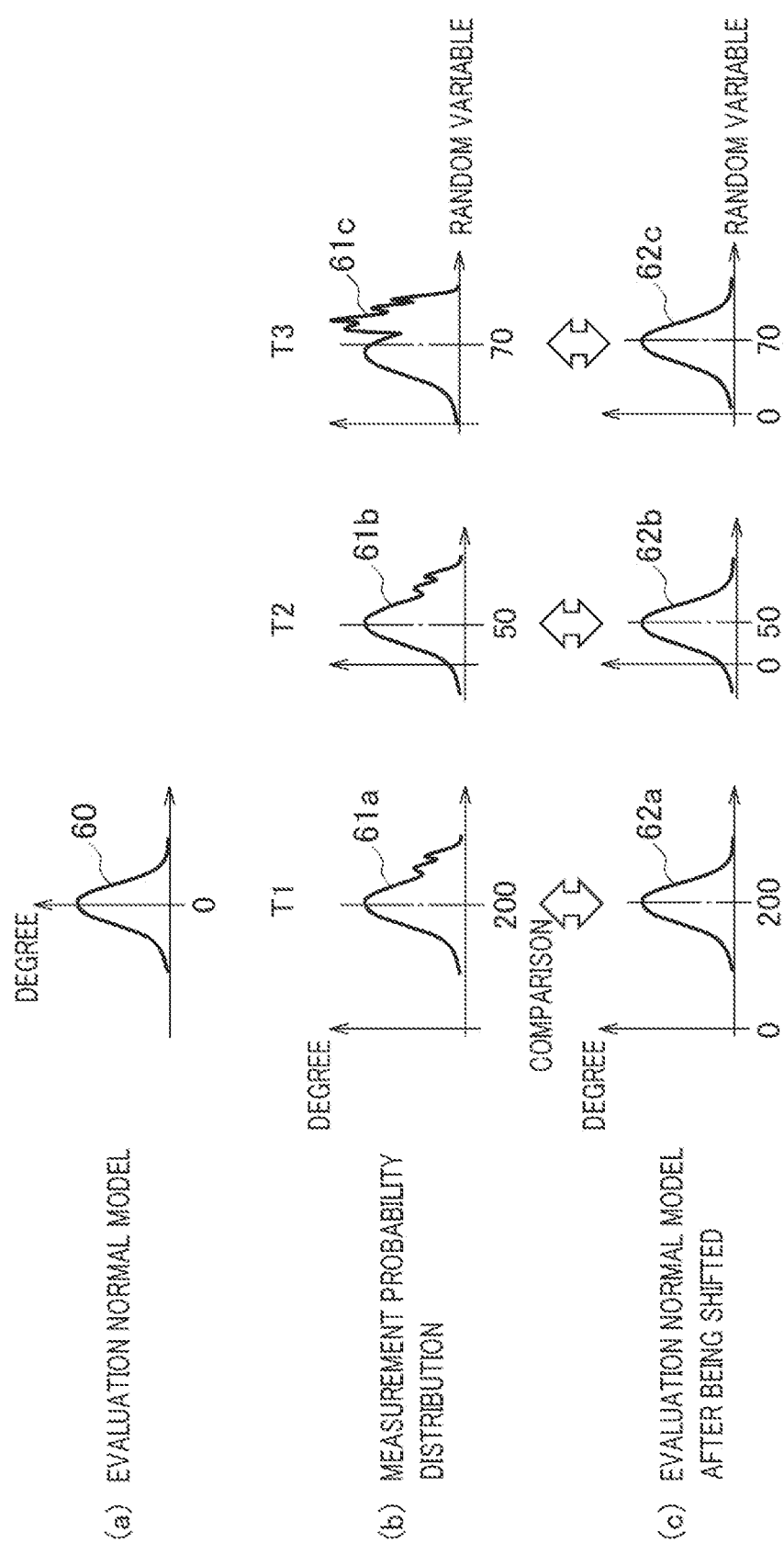
FIG. 4(a) is a waveform of an evaluation normal model.
FIG. 4(b) is a waveform of a measurement probability distribution in each of the periods T1, T2, and T3 shown in FIG. 3.
FIG. 4(c) is a waveform in which the evaluation normal model is shifted according, to the measurement probability distribution.

FIG. 3 is a graph showing a change in disturbance torque Q1 caused in the motor 14, and showing a case in which maintenance is made for the motor 14 at the time t1, FIG. 4(a) is a view showing a waveform 60 of an evaluation normal model described below, and FIG. 4(b) is an explanatory view showing waveforms 61a, 61b, and 61c of probability distributions in which the disturbance torque detected in each of the periods T1, T2, and 13 shown in FIG. 3 is calculated as a random variable. FIG. 4(c) is an explanatory view showing waveforms 62a, 62b, and 62c in which the evaluation normal model is shifted in the direction of the axis of abscissas. When the disturbance torque Q1 fluctuates about "200" in the period T1 shown in FIG. 3, for example, the probability distribution in which the average is about 200 is obtained as indicated by the waveform 61a shown in FIG. 4(b). The specific explanations of the graphs shown in FIG. 3 and FIG. 4 are made below. The "predetermined period" in which the disturbance torque is acquired may be a constant period, or may be changed as appropriate depending on the size of the disturbance torque.

The probability distribution parameter extraction unit 23 shown in FIG. 1 extracts parameters such as an average, a median, and a standard deviation of the probability distribution when calculated by the probability distribution calculation unit 22 described above. For example, the average is "200" in the waveform 61a of the probability distribution in the period T1 shown in FIG. 4(a). The term "median" refers to a median of the entire disturbance torque acquired as a sample.

The evaluation normal model calculation unit 24 generates the evaluation normal model based on the normal model stored in the normal model DB 34. In particular, the evaluation normal model calculation unit 24 acquires the disturbance torque caused before the disturbance torque acquired in the predetermined period (for example, 12 hours) used when the probability distribution calculation unit 22 generates the measurement probability distribution. The evaluation normal model calculation unit 24 processes to calculate the normal model according to the acquired disturbance torque so that the entire degree conforms to the degree of the measurement probability distribution, and uses the calculated normal model as the evaluation normal model. The disturbance torque used for the calculation of the measurement probability distribution (the data regarding the state of the apparatus) is thus acquired after the disturbance torque used for the calculation of the evaluation normal model.

The waveform 60 in which the average is zero is thus created, as shown in FIG. 4(a). While the present embodiment is illustrated with the case in which the entire degrees conform to each other between the measurement probability distribution and the evaluation normal model, the conformity of the entire degrees is not a required condition, and the entire degrees may differ from each other.

The motor abnormality determination unit 25 compares the measurement probability distribution calculated by the probability distribution calculation unit 22 with the evaluation normal model calculated by the evaluation normal model calculation unit 24, so as to determine whether the target motor 14 has an abnormality. In particular, the motor abnormality determination unit 25 shifts the evaluation normal model such that the average (the reference point) of the evaluation normal model conforms to the average (the reference point) of the measurement probability distribution. The motor abnormality determination unit 25 then calculates the amount of difference between the measurement probability distribution and the evaluation normal model by means of density ratio estimation, and determines that the target motor 14 has an abnormality when the amount of difference calculated is greater than a reference amount of difference used as a reference.

As another means, the motor abnormality determination unit 25 determines that the motor 14 has an abnormality when a ratio between a degree of the random variable in the measurement probability distribution and a degree of each random variable in the evaluation normal model is greater than a reference ratio. Alternatively, the motor abnormality determination unit 25 calculates a difference between the degree of the random variable in the measurement probability distribution and the degree of each random variable in the evaluation normal model, and determines that the motor 14 has an abnormality when the difference is greater than a reference value.

While the above embodiment is illustrated with the average as an example of the reference point, the reference point only needs to be a point indicating a reference of each of the measurement probability distribution and the evaluation normal model. For example, the median of each of the measurement probability distribution and the evaluation normal model may be used as the reference point.

The specific explanations of the abnormality determination method are made below with reference to FIG. 3 and FIG. 4. As described above, FIG. 3 illustrates the change in the disturbance torque caused in the motor 14. The maintenance is made for the motor 14 at the time t1 shown in FIG. 3, at which the disturbance torque greatly changes.

The disturbance torque Q1 slightly fluctuates in the vertical direction about 200 in the period T1 shown in FIG. 3. The probability distribution calculation unit 22 then calculates the probability distribution in which the average is 200, as indicated by the waveform 61a shown in FIG. 4(b). The disturbance torque Q1 also slightly fluctuates in the vertical direction about 50 in the period T2, The probability distribution calculation unit 22 then calculates the probability distribution in which the average is 50, as indicated by the waveform 61b shown in FIG. 4(b).

The disturbance torque Q1 greatly fluctuates in the period T3 shown in FIG. 3. The probability distribution calculation unit 22 then calculates the probability distribution in which the average is 70 and the waveform greatly fluctuates, as indicated by the waveform 61c shown in FIG. 4(b).

The motor abnormality determination unit 25 shifts the evaluation normal model calculated by the evaluation normal model calculation unit 24, which is the waveform 60 shown in FIG. 4(a), in the direction of the axis of abscissas, and compares the shifted evaluation normal model with the respective waveforms 61a, 61b, and 61c.

In particular, when the waveform 61a of the probability distribution in which the average of the disturbance torque is 200 (refer to FIG. 4(b)) is acquired in the period T1 shown in FIG. 3, the motor abnormality determination unit 25 shifts the evaluation normal model so as to have the average of 200, as indicated by the waveform 62a (refer to FIG. 4(c)). The motor abnormality determination unit 25 then calculates the amount of difference between the waveform 61a and the waveform 62a by the density ratio estimation, and determines that the motor 14 has an abnormality when the amount of difference exceeds the reference amount of difference.

The method for the comparison between the waveform 61a and the waveform 62a is not limited to the density ratio estimation, and may be the method of acquiring the ratio between the degrees of the respective random variables described above. For example, when comparing the waveform 61a and the waveform. 62a shown in FIG. 4, the motor abnormality determination unit 25 calculates the ratio between the degrees of the respective random variables. The ratio is "1" when the waveform 61a and the waveform 62a completely conform to each other. When there is a difference between the waveform 61a and the waveform 62a, the above ratio varies depending on the amount of difference. For example, the motor 14 is determined to have an abnormality when the ratio exceeds "1.2".

Another method for the comparison between the waveform 61a and the waveform 62a is to obtain a difference between the degrees of the respective random variables, so as to determine an abnormality of the motor 14 based on the level of the difference.

As described above, the motor abnormality determination unit 25 shifts the evaluation normal model such that the average of the measurement probability distribution and the average of the evaluation normal model conform to each other to compare the respective waveforms 61a and 62a. The motor abnormality determination unit 25 then determines that the motor 14 has an abnormality when the amount of difference is large.

Returning to FIG. 1, the alarm output unit 26 outputs an alarm signal to the user interface 103 when the motor abnormality determination unit 25 determines the occurrence of an abnormality. The alarm signal indicating the occurrence of an abnormality is displayed on the display of the user interface 103, so as to notify the operator of the occurrence of an abnormality.

Figure 2:
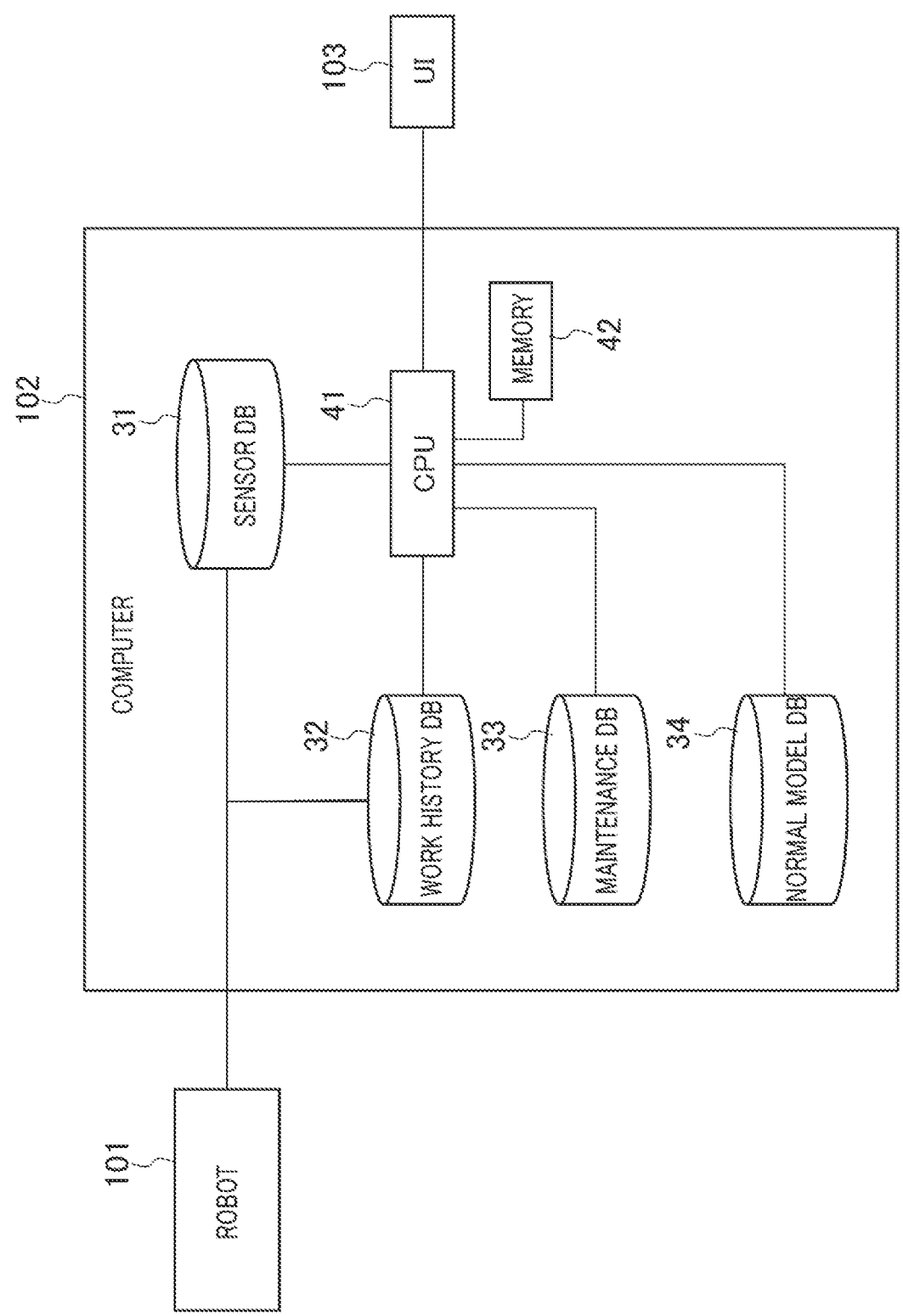
FIG. 2 is an explanatory diagram showing an example in which the abnormality determination device shown in FIG. 1 is implemented by an integrated computer.

The abnormality determination device 102 may be implemented by a computer including a central processing unit (CPU) 41, a memory 42, and the various databases (the sensor DB 31, the work history DB 32, the maintenance DB 33, and the normal model DB 34), as illustrated in FIG. 2. A computer program (an abnormality determination program) is installed on the computer and executed so as to function as the abnormality determination device 102. The CPU 41 thus functions as a plurality of information processing circuits included in the abnormality, determination device 102, namely, functions as the communication unit 21, the probability distribution calculation unit 22, the probability distribution parameter extraction unit 23, the evaluation normal model calculation unit 24, the motor abnormality determination unit 25, and the alarm output unit 26. The CPU 41 also functions as an abnormality level determination unit 28 shown in FIG. 6 described in a second embodiment below.

Figure 5:
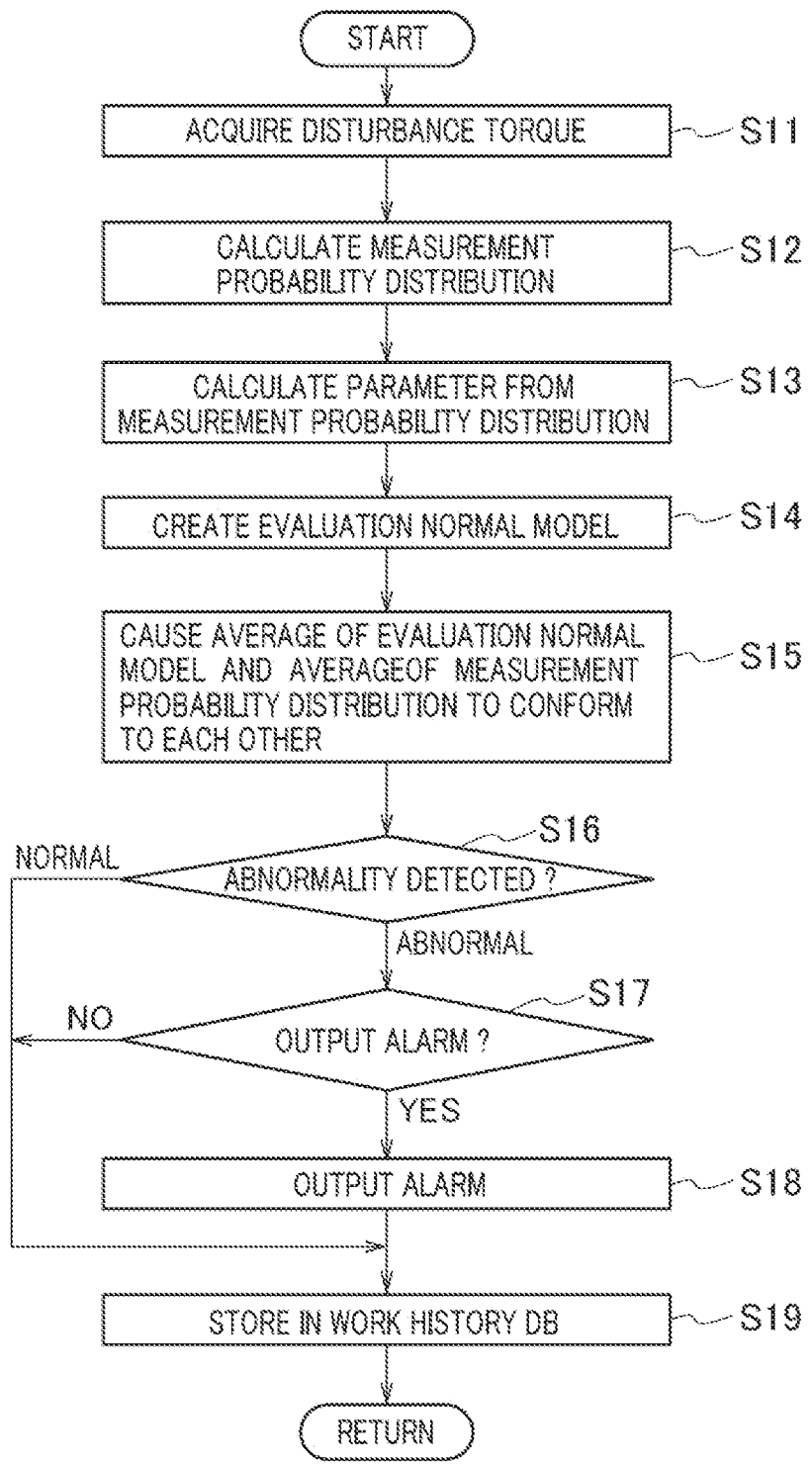
FIG. 5 is a flowchart showing a processing process performed by the abnormality determination device according to the first embodiment of the present invention.

The respective functions included in the abnormality determination device 102 described above can be implemented in single or plural processing circuits. The respective processing circuits include a programmed processing device, such as a processing device including an electric circuit. The processing device includes an application-specific integrated circuit (ASIC) configured to execute the functions included in the abnormality determination device 102 or conventional circuit components, Explanations of Operation of First Embodiment Next, the processing process of the abnormality determination device 102 according to the first embodiment is described below with reference to the flowchart shown in FIG. 5.

First, in step S11, the probability distribution calculation unit 22 acquires the disturbance torque of the motor 14 (the data regarding the state of the apparatus). The disturbance torque of the motor 14 sent from the robot 101 is received by the communication unit 21, and is stored in the sensor DB 31. The probability distribution calculation unit 22 acquires this disturbance torque.

In step S12, the probability distribution calculation unit 22 calculates a probability distribution based on the acquired disturbance torque. In particular, the probability distribution calculation unit 22 sets a predetermined period (for example, 12 hours), and acquires the probability distribution by means of kernel density estimation, for example, in accordance with the disturbance torque acquired during a period retroactive to the predetermined period from the current time. The probability distribution calculation unit 22 uses the acquired probability distribution as the measurement probability distribution. For example, when the predetermined period is the period T1 shown in FIG. 3, in which the disturbance torque fluctuates about "200", the measurement probability distribution indicated by the waveform 61a shown in FIG. 4(b) is obtained.

In step S13, the probability distribution parameter extraction unit 23 calculates the parameters such as the degree, the average, the median, and the standard deviation of the corresponding measurement probability distribution calculated in step S12.

In step S14, the evaluation normal model calculation unit 24 refers to the normal model stored in the normal model DB 34 so as to create the probability distribution (the evaluation normal model) with the same degree as the measurement probability distribution calculated in step S12. The evaluation normal model in which the average is zero and the entire degree is the same as the measurement probability distribution is thus created, as indicated by the waveform 60 shown in FIG. 4(a).

In step S15, the motor abnormality determination unit 25 shifts the evaluation normal model so that the average of the evaluation normal mode conforms to the average of the measurement probability distribution. In particular, as indicated by the waveform 61a shown in FIG. 4(b), when the average of the measurement probability distribution is "200", the waveform 60 of the evaluation normal model in which the average is zero as shown in FIG. 4(a) is shifted to the waveform 62a shown in FIG. 4(c). This causes the respective averages of the waveform 61a and the waveform 62a to conform to each other.

In step S16, the motor abnormality determination unit 25 compares the measurement probability distribution (the waveform 61a) with the evaluation normal model (the waveform 62a) so as to determine an abnormality. As described above, the motor abnormality determination unit 25 compares the respective waveforms 61a and 62a by the density ratio estimation, and determines that the motor 14 has an abnormality when the amount of difference between the waveforms 61a and 62 exceeds the predetermined reference amount of difference.

For example, the waveform 61a acquired in the period T1 and the waveform 61b acquired in the period T2 shown in FIG. 3 and FIG. 4 are not greatly changed as compared with the respective waveforms 62a and 62b of the evaluation normal model, and the motor 14 is thus determined to be in a normal state. The waveform 61c acquired in the period T3 is greatly changed with respect to the waveform 62c of the evaluation normal model, and the motor 14 is thus determined to have an abnormality.

The process proceeds to step S19 when the motor 14 is determined to be in the normal state in step S16, or the process proceeds to step S17 when the motor 14 is determined to have an abnormality.

In step S17, the alarm output unit 26 determines whether to output the alarm, and the process proceeds to step S19 when not outputting the alarm. When outputting the alarm, the alarm output unit 26 outputs the alarm to the user interface 103 in step S18. The alarm is thus displayed on the display provided in the user interface 103, so as to notify the operator that the motor 14 has an abnormality.

In step S19, the motor abnormality determination unit 25 stores the occurrence abnormality of the motor 14 in the work history DB 32.

The process described above thus can determine the occurrence of an abnormality when caused in the motor 14 immediately and accurately.

As described above, the abnormality determination device 102 according to the first embodiment can achieve the following effects.

(1)

The abnormality determination device 102 calculates the measurement probability distribution of the disturbance torque caused in the motor 14, and also calculates the evaluation normal model. The abnormality determination device 10:2 then compares the measurement probability distribution with the evaluation normal model so as to determine whether the motor 14 (the movable part), namely, the robot 101 (the apparatus) has an abnormality in accordance with the comparison result. The occurrence of an abnormality caused in the robot 101 thus can be determined with a high accuracy if the disturbance torque (the data regarding the state of the apparatus) greatly fluctuates due to the maintenance or the teaching.

(2)

The abnormality determination device 102 also causes the respective reference points such as the averages or the medians of the measurement probability distribution and the evaluation normal model to conform to each other to compare the measurement probability distribution with the evaluation normal model, so as to determine the amount of difference therebetween with a high accuracy, improving the accuracy of the abnormality determination accordingly.

(3)

The disturbance torque used for the calculation of the measurement probability distribution is acquired after the disturbance torque used for the calculation of the evaluation normal model, so as to calculate the evaluation normal model by use of the more stable disturbance torque, and determine the occurrence of an abnormality caused in the robot 101 with a higher accuracy.

(4)

The motor abnormality determination unit 25 determines the occurrence of an abnormality of the motor 14 in accordance with the ratio between the degree of the random variable in the measurement probability distribution and the degree of the random variable in the evaluation normal model, so as to determine the occurrence of an abnormality caused in the motor 14, namely, caused in the robot 101 with a high accuracy.

(5)

The motor abnormality determination unit 25 calculates the difference between the degree of the random variable in the measurement probability distribution and the degree of the random variable in the evaluation normal model, and determines the occurrence of an abnormality of the motor 14 based on the difference calculated, so as to achieve a highly-accurate determination of the occurrence of an abnormality caused in the motor 14, namely, caused in the robot 101.

(6)

The evaluation normal model calculation unit 24, when creating the evaluation normal model, uses one of the I-distribution, the normal distribution, and the histogram, so as to accurately obtain the evaluation normal model, and make a determination of the occurrence of an abnormality of the robot 101 with a high accuracy accordingly.

(7)

The probability distribution calculation unit 22 calculates the measurement probability distribution based on the disturbance torque by the kernel density estimation, so as to create the measurement probability distribution with a high accuracy, and accurately determine the occurrence of an abnormality of the robot 101 accordingly.

Explanations of Second Embodiment

Figure 6:
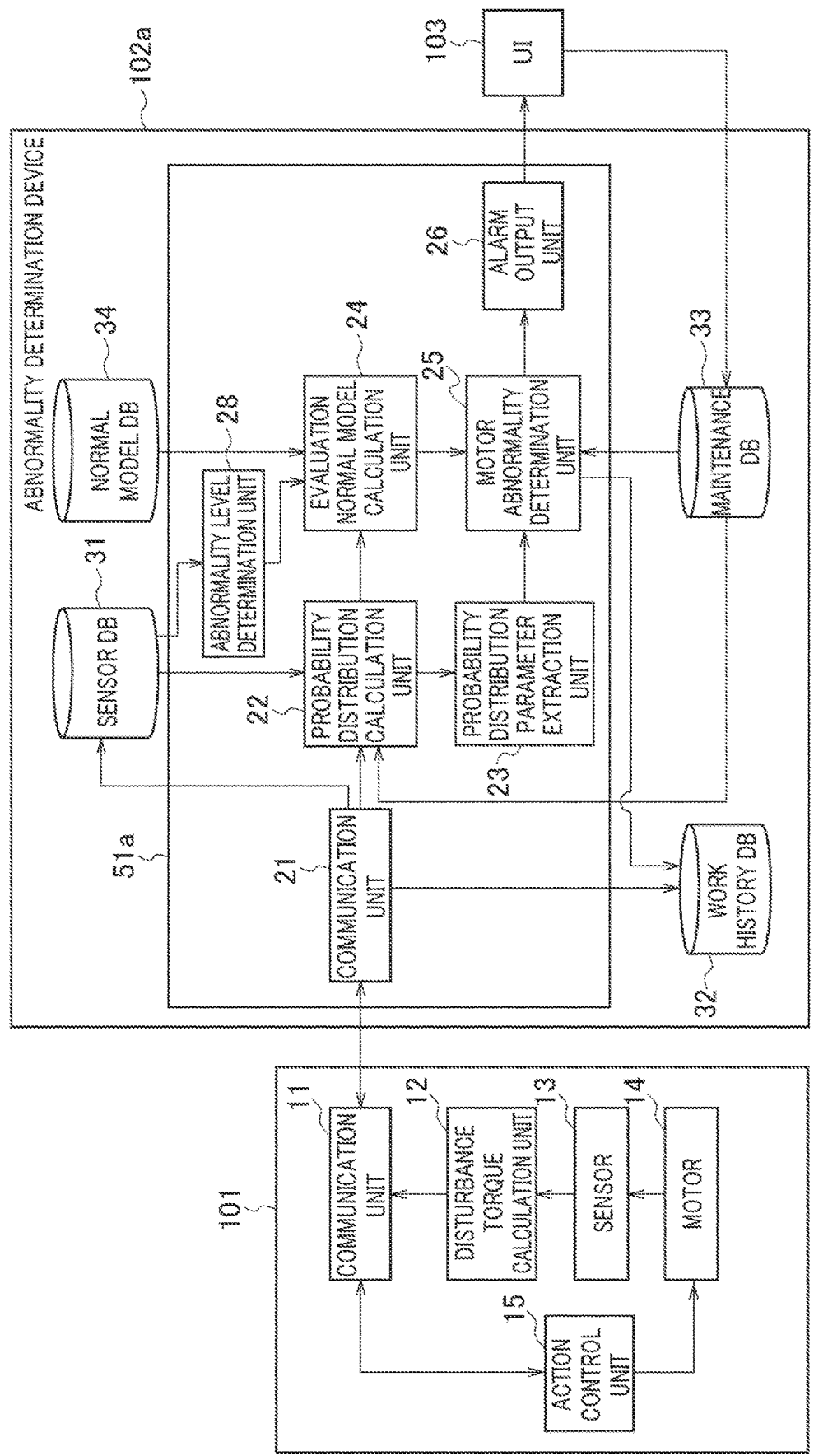
FIG. 6 is a block diagram illustrating a configuration of an abnormality determination device according to a second embodiment of the present invention, and peripheral apparatuses.

A second embodiment according to the present invention is described below. FIG. 6 is a block diagram illustrating a configuration of an abnormality determination device 102a according to the second embodiment and peripheral apparatuses. The abnormality determination device 102a according to the second embodiment differs from the abnormality determination device 102 shown in FIG. 1 described above in that the control unit 51a further includes an abnormality level determination unit 28. The other configurations are the same as those shown in FIG. 1 and indicated by the same reference numerals, and overlapping explanations are not repeated below.

The abnormality level determination unit 28 acquires the disturbance torque of the motor 14 having been caused before from the sensor DB 31, and calculates an abnormality level of the disturbance torque acquired, A method of calculating the abnormality level is described below.

The abnormality level a(x'), where x' is the disturbance torque, is given by the following formula (1):

$$a(x') = \{(x'-m)^2\}/2 \cdot s^2 \tag{1}$$

where m is a sample average of the disturbance torque, and s is a standard deviation of the disturbance torque.

The abnormality level calculated according to the formula (1) indicates abnormality of the disturbance torque itself.

The corresponding disturbance torque is determined to be abnormal when the abnormality level a(x') exceeds a predetermined first threshold. Instead of the above method, the abnormality level may be calculated by use of the kernel density estimation or the density ratio estimation.

Still another method of determining the abnormality of the disturbance torque itself is to calculate a difference between the disturbance torque and a predetermined value, and further calculate a rate of change of the difference with the passage of time. The corresponding disturbance torque can be determined to be abnormal when the rate of change calculated exceeds a predetermined threshold. The predetermined value may be an average of the disturbance torque acquired in the same month one year ago.

When the disturbance torque of which the abnormality level is determined to exceed the first threshold described above is present, the evaluation normal model calculation unit 24 creates the evaluation normal model excluding the corresponding disturbance torque. In particular, the evaluation normal model calculation unit 24 acquires the disturbance torque during a predetermined period of time, and when a ratio α of the disturbance torque of which the abnormality level is determined to exceed the first threshold to the entire disturbance torque acquired is a second threshold αth (where αth<<1) or greater, creates the evaluation normal model while excluding the corresponding disturbance torque. When the ratio of the disturbance torque of which the abnormality level is determined to exceed the first threshold to the entire disturbance torque is the second threshold αth or greater, the evaluation normal model calculation unit 24 creates the evaluation normal model by use of the disturbance torque of which the abnormality level does not exceed the first threshold.

Explanations of Operation of Second Embodiment

Figure 7:
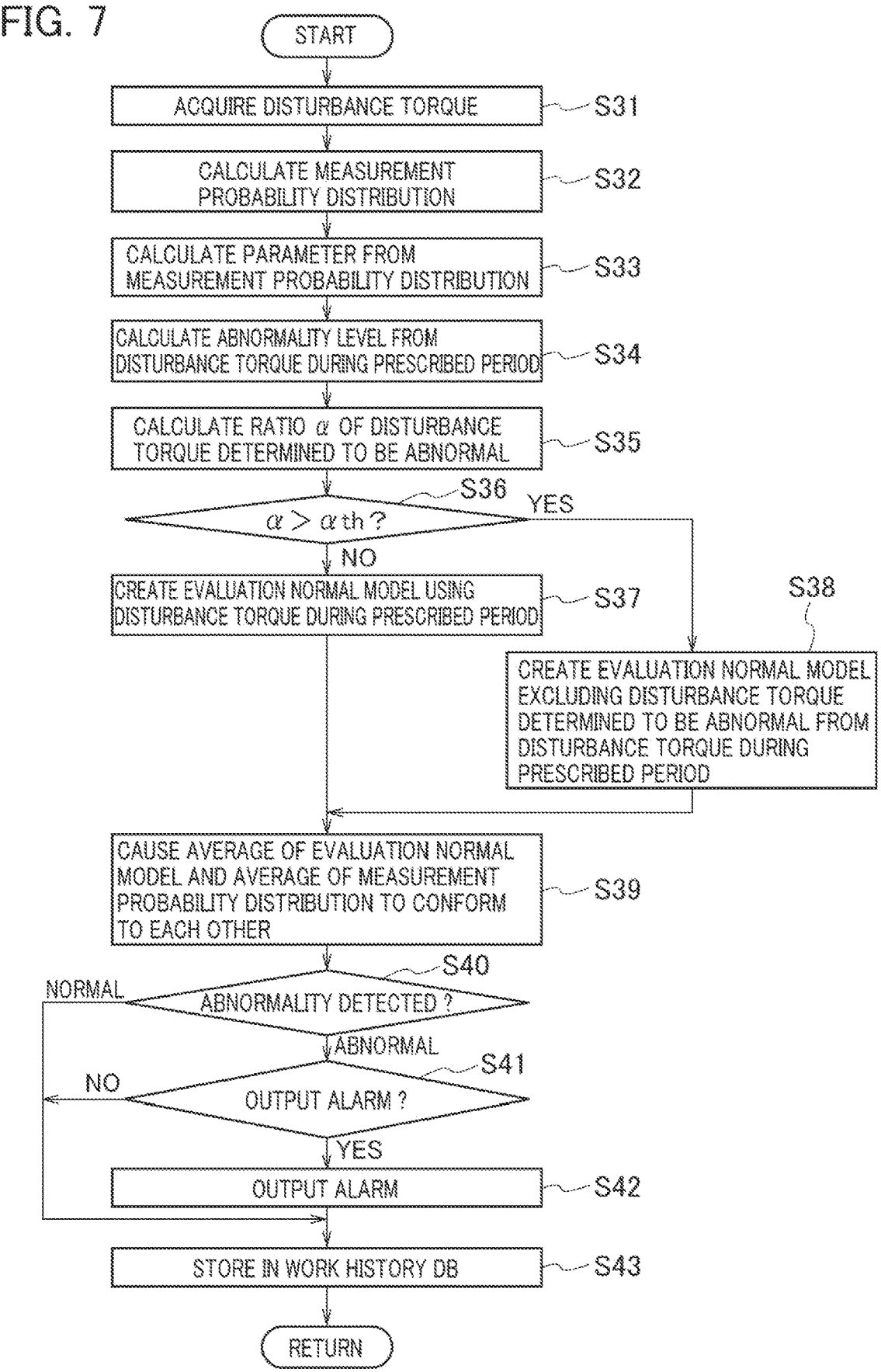
FIG. 7 is a flowchart showing a processing process performed by the abnormality determination device according to the second embodiment of the present invention.

Next, the processing process of the abnormality determination device 102a according to the second embodiment is described below with reference to the flowchart shown in FIG. 7.

First, in step S31, the probability distribution calculation unit 22 acquires the disturbance torque of the motor 14. The disturbance torque of the motor 14 sent from the robot 101 is received by the communication unit 21, and is stored in the sensor DB 31. The probability distribution calculation unit 22 acquires this disturbance torque.

In step S32, the probability distribution calculation unit 22 calculates the measurement probability distribution based on the acquired disturbance torque. In particular, the probability distribution calculation unit 22 sets a predetermined period (for example, 12 hours), and acquires the measurement probability distribution in accordance with the disturbance torque acquired during a period retroactive to the predetermined period from the current time.

In step S33, the probability distribution parameter extraction unit 23 calculates the parameters such as the degree, the average, the median, and the standard deviation of the corresponding measurement probability distribution calculated in step S32.

In step S34, the abnormality level determination unit 28 calculates the abnormality level of the disturbance torque acquired during a past prescribed period of time (for example, 12 hours). In particular, the abnormality level determination unit 28 calculates the abnormality level of the disturbance torque detected during the prescribed period of time according to the formula (1) described above.

In step S35, the abnormality level determination unit 28 calculates the ratio α of the disturbance torque of which the abnormality level is determined to exceed the first threshold.

In step S36, the abnormality level determination unit 28 determines whether the ratio α is greater than the second threshold αth, and the process proceeds to step S38 when α>αth, or the process proceeds to step S37 when α<αth.

In step S37, the evaluation normal model calculation unit 24 creates the evaluation normal model by use of the disturbance torque acquired during the prescribed period of time described above. The process then proceeds to step S39, In step S38, the evaluation normal model calculation unit 24 creates the evaluation normal model by use of the disturbance torque determined not to be abnormal in step S34, among the disturbance torque acquired during the prescribed period of time.

The processing from step S39 to step S43 is then executed. The processing from step S39 to step S43 is the same as the processing from step S15 to step S19 shown in FIG. 5, and overlapping explanations are not repeated below.

According to the second embodiment, the evaluation normal model is calculated in accordance with the past disturbance torque caused in the robot 101 (the apparatus) stored in the sensor DB 31, and the evaluation normal model is compared with the measurement probability distribution to determine an abnormality of the robot 101, so as to make a determination of an abnormality of the robot 101 with a high accuracy, The evaluation normal model is created by use of the disturbance torque of which the abnormality level does not exceed the first threshold if the disturbance torque of which the abnormality level exceeds the first threshold is included in the disturbance torque. This can create the evaluation normal model with a higher accuracy, so as to accurately determine the occurrence of an abnormality caused in the motor 14, namely, caused in the robot 101 accordingly.

Explanations of Third Embodiment

A third embodiment according to the present invention is described below. The device configuration is the same as that shown in FIG. 6 described in the second embodiment, and overlapping explanations are not repeated below.

The third embodiment differs from the second embodiment in referring to the maintenance data on the motor 14 stored in the maintenance DB 33, and using the disturbance torque acquired during a period other than a period (a maintenance period) during which the maintenance has been made, as the disturbance torque for the abnormality determination.

Figure 9:
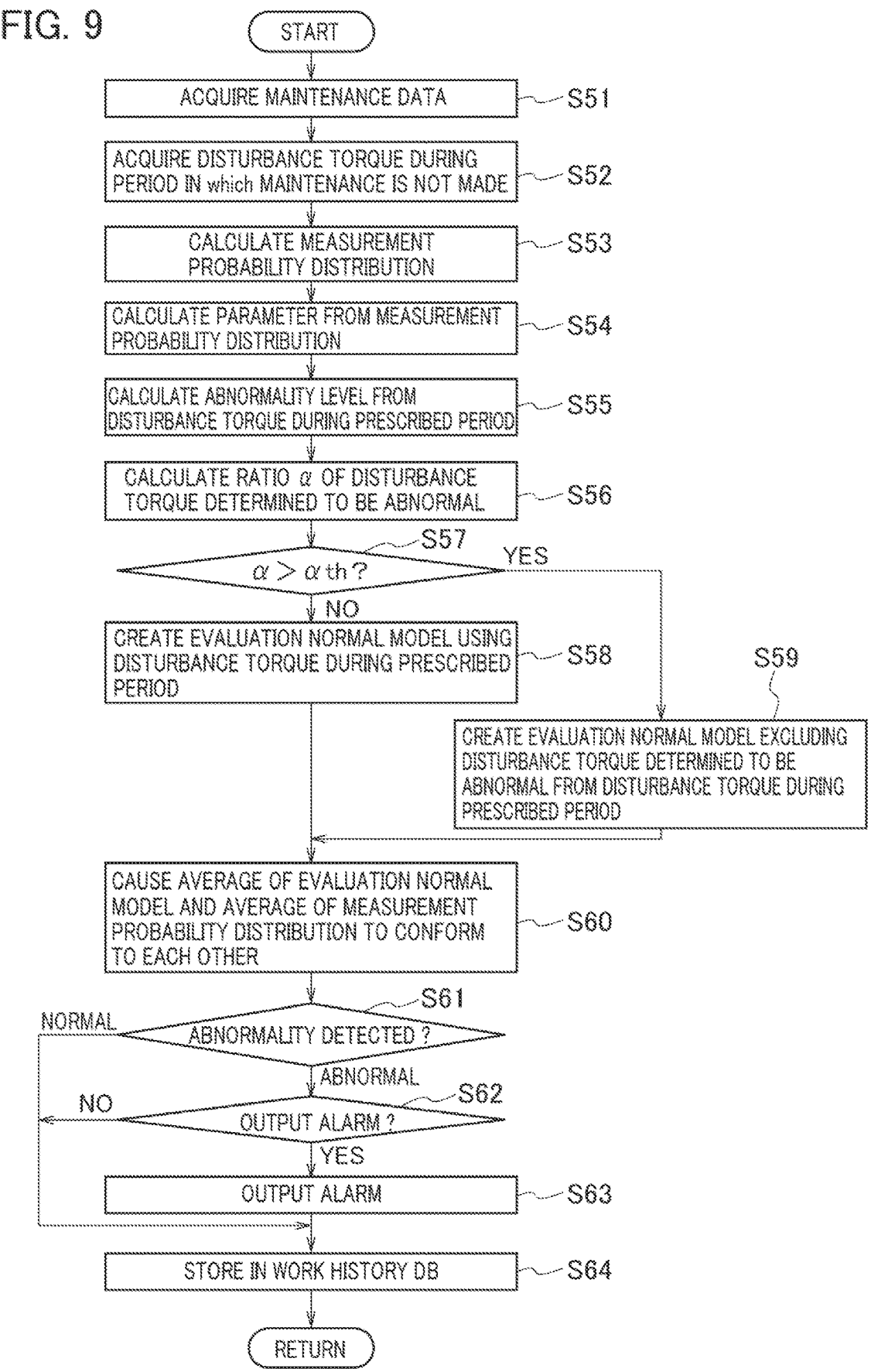
FIG. 9 is a flowchart showing a processing process performed by an abnormality determination device according to a third embodiment of the present invention.

The processing process of the abnormality determination device according to the third embodiment is described below with reference to the flowchart shown in FIG. 9.

First, in step S51, the probability distribution calculation unit 22 acquires information indicating the maintenance period which is the period during which the maintenance has been made, from the maintenance data stored in the maintenance DB 33.

Figure 8:
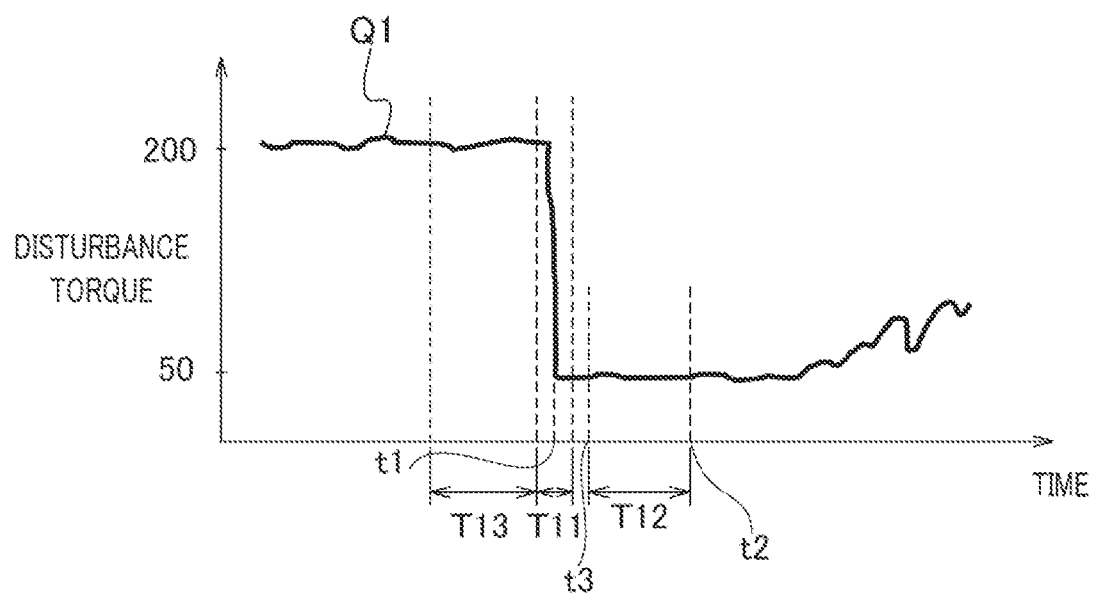
FIG. 8 is a graph showing a change in disturbance torque caused in a motor, wherein T1 indicates a period in which maintenance is made, and T2 and T3 each indicate a period in which the disturbance torque is acquired.

In step S52, the probability distribution calculation unit 22 acquires the disturbance torque during the period during which the maintenance is not made from the sensor DB 31, in accordance with the information indicating the maintenance period acquired in the processing in step S51. For example, as shown in FIG. 8, when the maintenance has been made at the time t1, the probability distribution calculation unit 22 acquires the disturbance torque excluding the period T11 during which the maintenance has been made. The probability distribution calculation unit 22 acquires the disturbance torque during the period T12 when the current point is the time t2, and acquires the disturbance torque during the period T13 when the current point is the time t3 while avoiding the period T11.

In step S53, the probability distribution calculation unit 22 calculates the measurement probability distribution based on the acquired disturbance torque.

The processing from step S54 to step S64 is then executed. The processing from step S54 to step S64 is the same as the processing from step S33 to step S43 shown in FIG. 7, and overlapping explanations are not repeated below.

The abnormality determination device according to the third embodiment acquires the information indicating the maintenance period from the maintenance DB 33, and calculates the measurement probability distribution in accordance with the disturbance torque acquired during the period other than the maintenance period. The disturbance torque typically greatly fluctuates immediately before and after the execution of maintenance. The abnormality determination device according to the third embodiment can avoid an influence of fluctuation of the disturbance torque during the maintenance period, so as to determine the occurrence of an abnormality caused in the robot 101 with a higher accuracy.

The apparatus as an abnormality determination target is not limited to the robot 101. For example, an engine of a vehicle instead of the motor 14 or a transmission instead of the speed reducer may be applicable as a target. Any apparatus including a rotating mechanism and a transmitting mechanism thereof can be a target to be determined, such as a rotating mechanism of a moving object, a moving object such as playground equipment in an amusement park, and a work machine such as a three-dimensional printer. Any other types of apparatus may also be a target to be determined.

The abnormality determination device may be installed in a remote place to send/receive necessary signals or data via a communication line so as to determine an abnormality of the apparatus. The abnormality determination of a plurality of apparatuses may be executed by a single abnormality determination device. The plural apparatuses may be installed at different locations.

While the present invention has been described above by reference to the embodiments, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST

11 COMMUNICATION UNIT
12 DISTURBANCE TORQUE CALCULATION UNIT
13 SENSOR
14 MOTOR (MOVABLE PART)
15 ACTION CONTROL UNIT
21 COMMUNICATION UNIT
22 PROBABILITY DISTRIBUTION CALCULATION UNIT
23 PROBABILITY DISTRIBUTION PARAMETER EXTRACTION UNIT
24 EVALUATION NORMAL MODEL CALCULATION UNIT
25 MOTOR ABNORMALITY DETERMINATION UNIT
26 ALARM OUTPUT UNIT
28 ABNORMALITY LEVEL DETERMINATION UNIT
31 SENSOR DB (STORAGE UNIT)
32 WORK HISTORY DB
33 MAINTENANCE DB
34 NORMAL MODEL DB
41 CPU
42 MEMORY
51,51*a* CONTROL UNIT
101 ROBOT (APPARATUS)
102, 102*a* ABNORMALITY DETERMINATION DEVICE
103 USER INTERFACE (UI)

The invention claimed is:

1. An abnormality determination device comprising a controller for determining an abnormality of an apparatus including a movable part in accordance with pieces of data regarding a state of the apparatus acquired from a sensor installed in the apparatus, the controller being configured to:
calculate a measurement probability distribution which is a probability distribution using the data acquired during a past predetermined period as a random variable;
shift an evaluation normal model such that a reference point of the evaluation normal model conforms to a reference point of the measurement probability distribution, the evaluation normal model being a probability distribution created by using, as a random variable, the data acquired during a period before the predetermined period excluding the data determined to be abnormal;
compare the measurement probability distribution with the evaluation normal model of which the respective reference points conform to each other; and
determine the abnormality of the apparatus in accordance with a result of the comparison.

2. The abnormality determination device according to claim 1,
wherein the reference points are each an average or a median of each of the measurement probability distribution and the evaluation normal model.

3. The abnormality determination device according to claim 1, further comprising a database configured to store the data, wherein the controller calculates the evaluation normal model in accordance with the data stored in the database.

4. The abnormality determination device according to claim 1, wherein the controller is configured to:
calculate an abnormality level indicating abnormality of the data itself; and
determine that the data is abnormal when the abnormality level exceeds a first threshold.

5. The abnormality determination device according to claim 1, wherein the controller determines the abnormality of the apparatus in accordance with a ratio between a degree of the random variable in the measurement probability distribution and a degree of each random variable in the evaluation normal model.

6. The abnormality determination device according to claim 1, wherein the controller determines the abnormality of the apparatus in accordance with a difference between a degree of the random variable in the measurement probability distribution and a degree of each random variable in the evaluation normal model.

7. The abnormality determination device according to claim 1, wherein the controller is configured to:
acquire information indicating a maintenance period during which maintenance is made for the apparatus; and
set a period other than the maintenance period as the predetermined period.

8. The abnormality determination device according to claim 1, wherein the controller sets the evaluation normal model by use of one of a t-distribution, a normal distribution, and a histogram.

9. The abnormality determination device according to claim 1, wherein the controller calculates the measurement probability distribution by use of kernel density estimation.

10. An abnormality determination method of determining an abnormality of an apparatus including a movable part in accordance with pieces of data regarding a state of the apparatus acquired from a sensor installed in the apparatus, the method comprising:
calculating a measurement probability distribution which is a probability distribution using the data acquired during a past predetermined period as a random variable;

shifting an evaluation normal model such that a reference point of the evaluation normal model conforms to a reference point of the measurement probability distribution, the evaluation normal model being a probability distribution created by using, as a random variable, the data acquired during a period before the predetermined period excluding the data determined to be abnormal;

comparing the measurement probability distribution with the evaluation normal model of which the respective reference points conform to each other; and determining the abnormality of the apparatus in accordance with a result of the comparison.

* * * * *